US012750202B2

(12) United States Patent
Pinski et al.

(10) Patent No.: US 12,750,202 B2
(45) Date of Patent: Sep. 29, 2026

(54) SYSTEMS AND METHODS FOR PROCESSING SERIAL COMMUNICATIONS USING BIFURCATED APPLICATION PROGRAMMING SUBROUTINES

(71) Applicant: Capital One Services, LLC, McLean, VA (US)

(72) Inventors: David Aaron Pinski, Merion Station, PA (US); Louis Alexander, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 24 days.

(21) Appl. No.: 19/054,683

(22) Filed: Feb. 14, 2025

(65) Prior Publication Data

US 2026/0246604 A1 Aug. 20, 2026

(51) Int. Cl.
*H04L 9/00* (2022.01)
*G06F 21/60* (2013.01)

(52) U.S. Cl.
CPC ............ *H04L 9/001* (2013.01); *G06F 21/602* (2013.01)

(58) Field of Classification Search
CPC ............................... H04L 9/001; G06F 21/602
See application file for complete search history.

(56) References Cited

U.S. PATENT DOCUMENTS

2022/0029886 A1* 1/2022 Hameiri .................. H04L 47/70
2024/0232381 A1* 7/2024 Rosenoer ................ H04L 63/20
2025/0199849 A1* 6/2025 Irvine .................... G06F 9/4881
2026/0106892 A1* 4/2026 Mautone ................. G06F 21/31

* cited by examiner

*Primary Examiner* — Techane Gergiso
(74) *Attorney, Agent, or Firm* — Foley & Lardner LLP

(57) ABSTRACT

The system may receive, via a bifurcated serial communication processing API, a first serial communication for a first account, wherein the bifurcated serial communication processing API adds a first subroutine identifier to the first serial communication based on a first function for completing. The system may process the first serial communication using a first API subroutine based on the first subroutine identifier, wherein the first API subroutine comprises an account locking function. The system may determine a status of the first account based on the account locking function.

20 Claims, 5 Drawing Sheets

SYSTEMS AND METHODS FOR PROCESSING SERIAL COMMUNICATIONS USING BIFURCATED APPLICATION PROGRAMMING SUBROUTINES

BACKGROUND

Serial communications within computer networks refer to the process of transmitting data in a sequential manner, where the data is sent one bit at a time over a communication channel. This type of communication is essential in situations where the correct order of data transmission and reception is critical to maintaining the integrity and reliability of the information being exchanged. In a serial communication workflow, messages are typically arranged in a predefined sequence, and the network protocols ensure that the data is processed and transmitted following that order. For example, in protocols such as TCP/IP, the data packets must be received and assembled in the order they were sent to ensure accurate data reconstruction. Similarly, many industrial control systems and data transfer protocols rely on serial communication to coordinate operations between devices in a structured, step-by-step manner, ensuring that each stage of communication occurs only after the previous one has been successfully completed. This method reduces the risk of data corruption and ensures that workflows dependent on precise timing and order, such as in critical system operations or synchronous data transfers, are effectively managed.

Additionally, serial communications may be processed by different components in a structured and systematic way to ensure that each piece of data is handled in the correct order. As data is transmitted sequentially from the sender, it passes through various layers and components that are designed to interpret, process, and forward the information step by step. Each component in the communication chain is responsible for executing its specific function before passing the data to the next stage. For instance, in a computer network, the data might first be processed by a network interface controller (NIC), which translates the digital signals into data packets and ensures they adhere to communication standards. The packets are then handled by network protocols, such as TCP/IP, which ensure that they are ordered and error-checked before moving to higher-level components like an application layer. Similarly, in embedded systems or serial communication interfaces like UART (Universal Asynchronous Receiver-Transmitter), each component, such as a microcontroller or sensor, processes incoming data in order and performs necessary actions, such as data verification or signal conversion. The sequential processing ensures that each step is completed accurately before the next one begins, maintaining the integrity of the data and ensuring synchronized communication across the system.

SUMMARY

Systems and methods are described herein for novel uses and/or improvements to processing serial communications. For example, the system and methods may provide improved processing speeds for serial communication through the use of a bifurcated application programming interface (API) routine. A bifurcated application programming interface (API) routine is an approach in which an API provides two separate paths or mechanisms for processing requests and handling data. This dual-path structure allows the API to manage different types of operations or data flows efficiently, typically dividing them based on complexity, priority, or performance needs. For example, one path may be optimized for handling simple, high-speed requests that require minimal processing, while the other path may be dedicated to more complex operations that need thorough validation, transformation, or additional resources. By bifurcating the API routine, developers can optimize performance and resource allocation, ensuring that lightweight tasks do not suffer delays caused by more demanding processes. This approach is particularly useful in systems that must balance real-time requirements with heavy computational tasks or in distributed systems where certain operations must be prioritized to maintain system efficiency. The bifurcated routine provides flexibility and scalability, enabling the API to cater to diverse use cases and ensure efficient handling of varied workloads.

More specifically, the bifurcated API routine allows for a first API subroutine to process simple serial communications simultaneously and/or independently of event logging in a communication log (e.g., a digital ledger), while a second API subroutine processes complex serial communications. A communication log, or digital ledger, is a tool used to track the progress of processing serial communication by recording each step and interaction that occurs as data moves through the communication chain. This log serves as a chronological record, capturing details such as timestamps, the order of data packets, acknowledgments, and any errors or retransmissions. By documenting these events, the communication log provides a comprehensive history of the data flow, enabling system administrators and developers to monitor and verify that each stage of the communication process has been executed correctly and in the intended sequence. In cases of errors or interruptions, the log can help identify the exact point where the communication failed or was delayed, facilitating troubleshooting and ensuring that corrective actions can be taken promptly. Additionally, the ledger can be used for auditing, performance analysis, and ensuring compliance with protocols, as it provides evidence that data was transmitted, received, and processed according to predefined workflows. This level of detailed tracking is especially important in systems that require high reliability and data integrity, such as financial transactions, industrial automation, or secure communications.

Updating a communication log in real time can be time-intensive because each log entry often involves more than just a simple record of the event. Each update may require performing calculations, such as generating checksums, validating data integrity, or calculating timestamps. Additionally, these updates may depend on other components or processes that must be synchronized, such as waiting for acknowledgments from hardware devices or verifying the status of network interfaces. Even though each of these operations may only take a few hundred milliseconds, they can add up and become significant in the context of real-time computing applications, where the entire serial communication process must often be completed within extremely tight time constraints, sometimes in tens of milliseconds. This can create a bottleneck, as the overhead of maintaining an up-to-date communication log can interfere with the system's ability to meet its real-time performance requirements. As a result, balancing the need for comprehensive logging with the demands of high-speed, time-sensitive communication is a significant challenge in real-time computing environments, where efficiency and minimal latency are crucial.

In contrast to on-the-fly, real time updating of the communication log, existing systems may use batch processing to update communication logs (e.g., for a plurality of serial communications) at one time. While batch processing may further delay each serial communication's individual processing time, in the aggregate, batch processing may shorten logging times (and resource requirements to do so) for a plurality of serial communications as a whole. Nonetheless, batch processing is still unsuitable for real time and/or near real time applications and serial communication processing.

To overcome these technical deficiencies, systems and methods disclosed herein for a bifurcated API routine that allows for a first API subroutine to process simple serial communications simultaneously and/or independently of event logging in a communication log (e.g., a digital ledger), while a second API subroutine processes complex serial communications. However, separate API subroutines alone would not necessarily lead to faster overall processing times of serial communications with less resource use as the need for the additional API subroutines leads to additional system complexity. To compensate for this, the system includes an account locking function located within a first API subroutine that may be accessed by an account locking query during the complex API subroutine. For example, having an account locking function located within a first API subroutine designed for simple functions, which is then accessed by a second API subroutine handling more complex functions, allows for shorter overall processing times because it enables a more efficient and streamlined workflow. The first API subroutine is optimized for rapid execution, ensuring that critical operations like account locking can be performed quickly and without unnecessary delays. By handling the account locking function separately, the system can immediately secure the account in response to potential threats or policy violations, even before more complex processes are initiated or completed. This separation of responsibilities means that the second API subroutine, which may involve intensive tasks such as data validation, computation, or communication with multiple external services, does not need to handle basic security measures, reducing its overall processing load. Consequently, the system can operate more efficiently, with simple but crucial tasks being executed promptly in the first subroutine, while the second subroutine focuses on more complex operations without being burdened by additional security overhead. This division of labor improves response times and ensures that time-sensitive actions, like locking an account, are executed as swiftly as possible.

In some aspects, systems and methods for processing serial communications using bifurcated application interface programming (API) subroutines are described herein. For example, the system may receive, via a bifurcated serial communication processing API, a first serial communication for a first account, wherein the bifurcated serial communication processing API adds a first subroutine identifier to the first serial communication based on a first function for completing. The system may process the first serial communication using a first API subroutine based on the first subroutine identifier, wherein the first API subroutine comprises an account locking function. The system may determine a status of the first account based on the account locking function. The system may, in response to determining that the status corresponds to complete the first serial communication, completing the first serial communication. The system may generate for display, on a user interface, a first confirmation based on completing the first serial communication.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
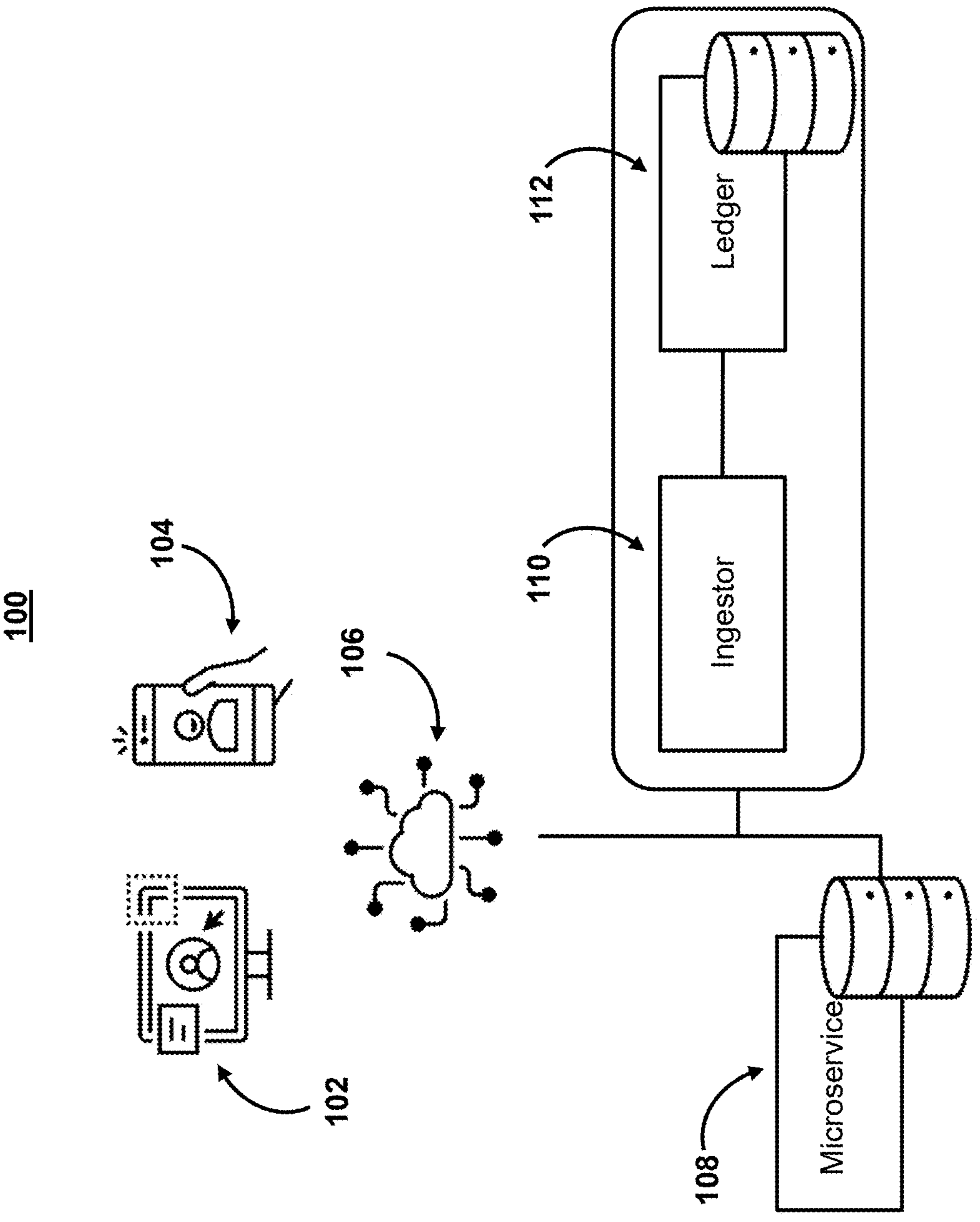
FIG. 1 shows an illustrative diagram for processing serial communications using bifurcated API subroutines, in accordance with one or more embodiments.

FIG. 1 shows an illustrative diagram for processing serial communications using bifurcated API subroutines, in accordance with one or more embodiments. For example, system 100 may comprise a system for processing serial communications using bifurcated API subroutines. For example, system 100, which includes a bifurcated serial communication processing API (e.g., API 106), may manage interactions between API users, such as API user 102 and API user 104, and the API (e.g., API 106) through a series of secure communications and access protocols. When API user 102, operating from a first secured network location, sends an encrypted request for access to API 106, the API first verifies the request and then responds by transmitting the necessary components or configuration information to enable API user 102 to interact with API 106 securely. This setup allows API user 102 to establish communication with API 106 and send data or requests in an orderly and encrypted fashion, ensuring that the information is protected throughout the transmission.

For example, API 106 may supply authentication credentials, such as API keys, OAuth tokens, or digital certificates, to ensure that API user 102 is properly authenticated before accessing the API. Alongside these credentials, encryption keys or secure protocols, such as TLS/SSL certificates, are needed to establish a secure and encrypted communication channel, safeguarding data transmission from eavesdropping or tampering. API 106 may also provide endpoint configuration details, specifying the URLs or network addresses where API user 102 should send requests. These endpoints could be separated into different paths for handling simple and complex operations, in line with the bifurcated API structure.

Additionally, API 106 may include information about request formats and data serialization methods, such as JSON or XML schemas, to ensure that API user 102 can structure its communications correctly. Rate limits, timeout settings, and retry policies could also be configured to manage the interaction efficiently and prevent system overloads. Finally, API 106 would supply documentation and access policies that outline security requirements, permissible actions, and guidelines for securely managing API keys or tokens. These components collectively ensure that API user 102 can establish a secure, compliant, and efficient connection to API 106, leveraging its bifurcated serial communication processing capabilities while maintaining data integrity and confidentiality.

Once API user 102 is connected to API 106, it can leverage the bifurcated structure of the API to efficiently process serial communications, where simple and complex operations are handled through distinct paths. Similarly, API user 104, potentially from a different secured network location, may also request and gain access to API 106, following a similar secure access protocol. For example, API 106 may manage interactions from multiple users by separating and processing requests according to the bifurcated design, ensuring that simple, high-priority requests are handled quickly while more complex tasks are processed appropriately. This approach optimizes the flow of serial communications, maintains data security, and enables efficient and parallel processing for multiple API users.

A bifurcated serial communication processing API (e.g., API 106) may be an API designed to handle serial communication tasks through two separate and specialized processing paths, often aimed at optimizing efficiency and resource management. The bifurcated structure divides incoming communication requests into two distinct categories: one path handles simpler, time-sensitive operations that require minimal processing, while the other path manages more complex, resource-intensive tasks. By separating these workflows, the API can prioritize critical or straightforward tasks for faster response times while still accommodating more complicated processes without causing delays or performance bottlenecks. This design is particularly useful in applications where both high-speed communication and detailed processing are necessary, such as in real-time systems or distributed networks.

Unlike traditional APIs, which often use a single path for processing all incoming requests, a bifurcated serial communication processing API provides a more granular and efficient approach. Traditional APIs might not differentiate between simple and complex operations, potentially leading to inefficiencies or delays when handling high volumes of mixed traffic. In contrast, the bifurcated API structure improves performance by optimizing resource allocation and ensuring that lightweight, essential tasks are completed swiftly while still providing the capability to process more demanding tasks as needed. This design enhances the overall responsiveness and scalability of the system, making it well-suited for environments with diverse communication requirements.

System 100, the bifurcated serial communication processing API (e.g., API 106) may receive a first serial communication from an API user (e.g., API user 102), which needs to be processed based on the nature and complexity of the requested function. Upon receiving this first serial communication, API 106 analyzes the content of the request to determine the appropriate processing path. The API then adds (or detects) a first subroutine identifier to the serial communication. This identifier may be a unique marker or label that specifies which subroutine or processing path should handle the communication. The identifier could represent a simple function, such as a data retrieval or a validation check, and is used by API 106 to route the communication efficiently. For example, an API identifier may be code or a label used by the API to categorize and direct incoming communications to the correct subroutine or processing path. It serves as a routing mechanism that helps the API understand how to handle the request. In this case, API 106 uses the first subroutine identifier to direct the serial communication to the correct part of the bifurcated API structure. For example, if the identifier indicates that the communication involves a straightforward function, it would be routed to the path optimized for simple and high-speed operations. If, instead, the identifier specifies a more complex function, the communication would be directed to the path designed to handle resource-intensive processing. By using these identifiers, API 106 ensures that each communication is efficiently processed according to its requirements, improving performance and maintaining the integrity of the serial communication workflow.

For example, if API 106 detects a simple function to be completed, the system may route the communication to microservice 108, which houses a simple API subroutine. In contrast, if API 106 detects a complex function to be completed, the system may route the communication to ingestor 110 and ledger 112. Ingestor 110 may receive the communication and arrange, manage, and/perform complex functions. Ledger 112, which acts as a digital log, may log the various processes (both individual and/or in aggregation) performed, the progress of the process, and/or additional information.

System 100 routes different functions to different API subroutines by analyzing the nature and complexity of each incoming request through the bifurcated serial communication processing API (e.g., API 106). API subroutines are specialized, modular components within an API that perform specific tasks or functions. They are designed to handle certain types of operations efficiently, whether those tasks are simple, such as data retrieval, or complex, such as data transformation or multi-step processing. When API 106 detects that a communication involves a simple function, it routes the request to a microservice, such as microservice 108, which houses a simple API subroutine optimized for rapid execution. This subroutine can quickly complete the task without unnecessary overhead, allowing the system to maintain high-speed performance for lightweight operations.

Microservice 108 houses a simple API subroutine by encapsulating the functionality required to perform lightweight and straightforward operations within an independent and self-contained service. This subroutine is designed to handle tasks such as data retrieval, simple calculations, or basic validation checks, which do not require extensive processing or coordination with other components. The microservice architecture allows this subroutine to operate efficiently, as it can be developed, deployed, and scaled independently from other, more complex parts of the system. By housing the simple API subroutine within a microservice, System 100 benefits from increased modularity, meaning the service can be easily updated or maintained without affecting the entire system.

Using a microservice for a simple API subroutine is advantageous because it enhances scalability and performance. Since microservices are designed to handle specific functions, the service can be optimized for quick execution and minimal resource usage, resulting in faster response times. Additionally, microservices can be easily scaled horizontally-meaning more instances can be added to handle increased load-without impacting other components of the system. This separation also simplifies the development and maintenance processes, as developers can work on the microservice independently, reducing the complexity of the overall system. Furthermore, microservices improve system reliability; if the simple API subroutine encounters an issue, it will not cause a complete system failure, as other parts of the system continue to function independently.

In contrast, if API 106 detects a more complex function that requires substantial processing, it routes the communication to specialized components like ingestor 110 and ledger 112. Ingestor 110 is responsible for handling complex functions, such as arranging and managing data, orchestrating multi-step processes, and performing intensive computations. It ensures that these functions are executed in an organized manner, often involving coordination with other system components. Ledger 112, acting as a digital log, records detailed information about the ongoing processes, including individual operations, progress updates, and aggregated data about the communication. This logging capability helps in monitoring and troubleshooting, as well as providing a clear audit trail of all actions performed. By routing requests to different API subroutines and components based on their complexity, system 100 ensures that resources are used efficiently, and both simple and complex tasks are managed effectively.

In some embodiments, system 100 monitors the status of a communication through a user interface that provides real-time visibility into the progress and performance of data as it moves through the bifurcated serial communication processing API (e.g., API 106) and other related components, such as microservice 108, ingestor 110, and ledger 112. The user interface displays detailed information, including timestamps of when the communication was received, the routing path it took, and which subroutines or microservices are handling its processing. Users can view status updates, such as whether the communication is completed, pending, or experiencing delays, as well as any errors or exceptions encountered during processing. The interface may also offer visual indicators, like progress bars or color-coded alerts, to provide a quick and intuitive understanding of the communication's status.

Moreover, the user interface can aggregate data from the digital ledger (ledger 112), which logs all processes performed on the communication. This allows users to access historical records, track the overall performance of the system, and analyze patterns or issues that may need attention. Advanced interfaces may also include features for filtering or searching specific communications, generating reports, or configuring alerts for critical events. By providing a comprehensive view of the communication status, the user interface ensures that system administrators and users can monitor, manage, and troubleshoot serial communication processes efficiently, enhancing overall system transparency and responsiveness.

As referred to herein, a "user interface" may comprise a human-computer interaction and communication in a device, and may include display screens, keyboards, a mouse, and the appearance of a desktop. For example, a user interface may comprise a way a user interacts with an application or a website. As referred to herein, "content" should be understood to mean an electronically consumable user asset, such as Internet content (e.g., streaming content, downloadable content, Webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but can also be part of a live performance. Furthermore, user generated content may include content created and/or consumed by a user. For example, user generated content may include content created by another, but consumed and/or published by the user.

As described herein, a communication may comprise any content. For example, the communication may comprise "time-series" data. As described herein, "time-series data" may include a sequence of data points that occur in successive order over some period of time. In some embodiments, time-series data may be contrasted with cross-sectional data, which captures a point-in-time. A time series can be taken on any variable that changes over time. The system may use a time series to track the variable (e.g., price) of an asset (e.g., security) over time. This can be tracked over the short term, such as the price of a security on the hour over the course of a business day, or the long term, such as the price of a security at close on the last day of every month over the course of five years. The system may generate a time series analysis. For example, a time series analysis may be useful to see how a given asset, security, or economic variable changes over time. It can also be used to examine how the changes associated with the chosen data point compare to shifts in other variables over the same time period. For example, with regards to retail loss, the system may receive time series data for the various sub-segments indicating daily values for theft, product returns, etc.

The system may monitor content generated by the user to generate user profile data. As referred to herein, "a user profile" and/or "user profile data" may comprise data actively and/or passively collected about a user. For example, the user profile data may comprise content generated by the user and a user characteristic for the user. A user profile may be content consumed and/or created by a user.

User profile data may also include a user characteristic. As referred to herein, "a user characteristic" may include information about a user and/or information included in a directory of stored user settings, preferences, and information for the user. For example, a user profile may have the settings for the user's installed programs and operating system. In some embodiments, the user profile may be a visual display of personal data associated with a specific user, or a customized desktop environment. In some embodiments, the user profile may be digital representation of a person's identity. The data in the user profile may be generated based on the system actively or passively monitoring.

For example, the bifurcated serial communication processing API is designed to optimize the processing of different types of tasks by assigning them to either a fast, lightweight subroutine or a more complex, resource-intensive one. The first API subroutine is tailored for simple, high-speed operations that can be completed in under 25-50 milliseconds. This subroutine focuses on tasks such as basic account lookups, balance checks, or flag verification, which require minimal computational effort and do not involve extensive data processing or communication with external systems. By keeping these tasks simple and efficiently designed, the first API subroutine ensures that critical, time-sensitive functions are executed almost instantaneously, allowing for rapid response times and minimal latency.

On the other hand, the second API subroutine is intended for more complex operations that inherently require more time to process. These tasks may include transferring funds between accounts, updating transaction records in a distributed ledger, or performing multi-step verifications that involve querying multiple data sources. Because of the increased complexity, the second API subroutine often involves more extensive calculations, data validation, and interactions with other components or external services, which can result in a processing time of over 50 (e.g., 50 to 150) milliseconds. The bifurcated design of the API ensures that the system can handle both types of operations efficiently, allocating resources based on the nature of each task and preventing simple requests from being delayed by more time-consuming processes. This separation allows for optimized performance across a wide range of functions, catering to both high-speed and complex needs.

Figure 2A:
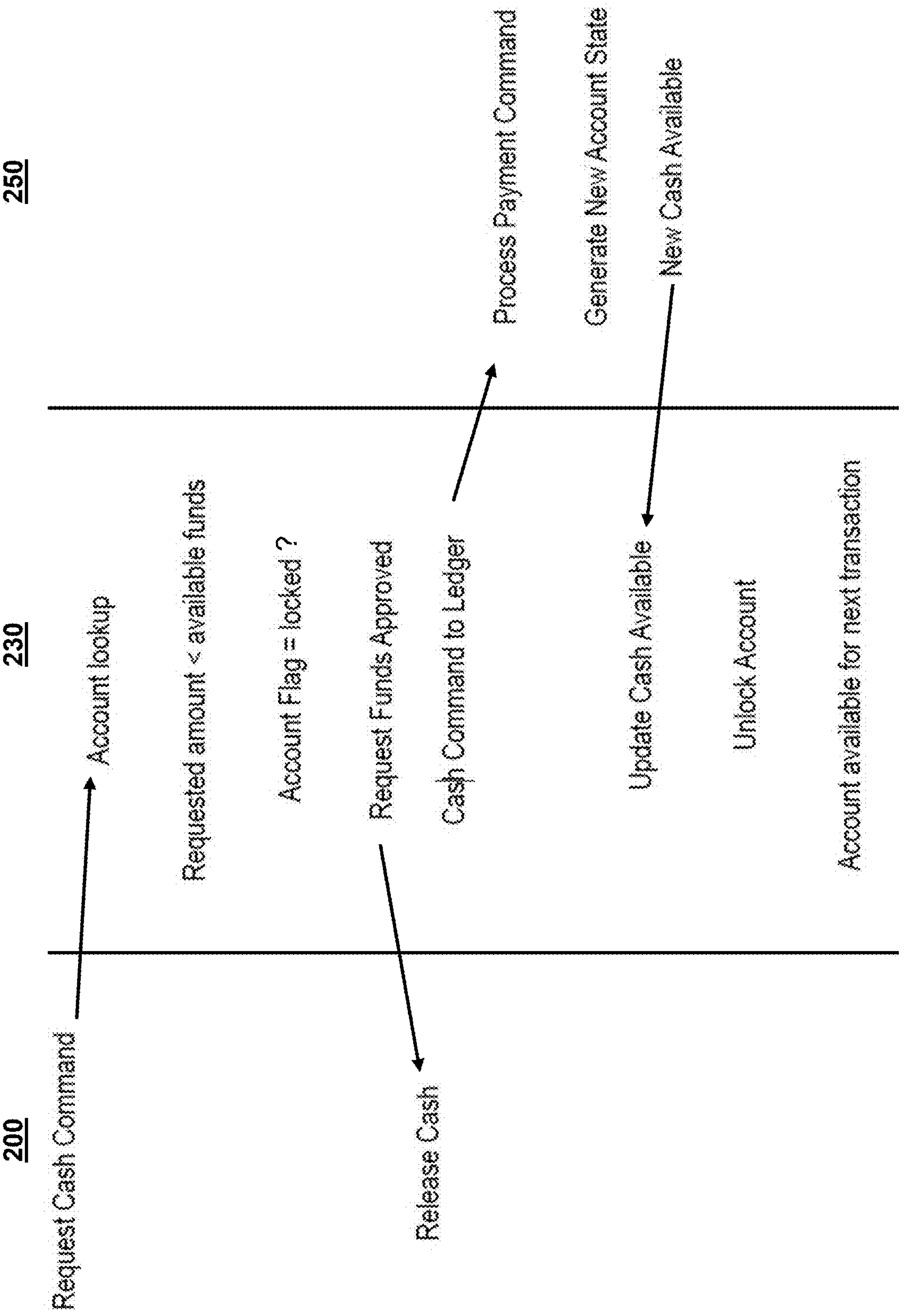
FIGS. 2A-B show an illustrative diagram for API subroutine workflows, in accordance with one or more embodiments.
Figure 2B:
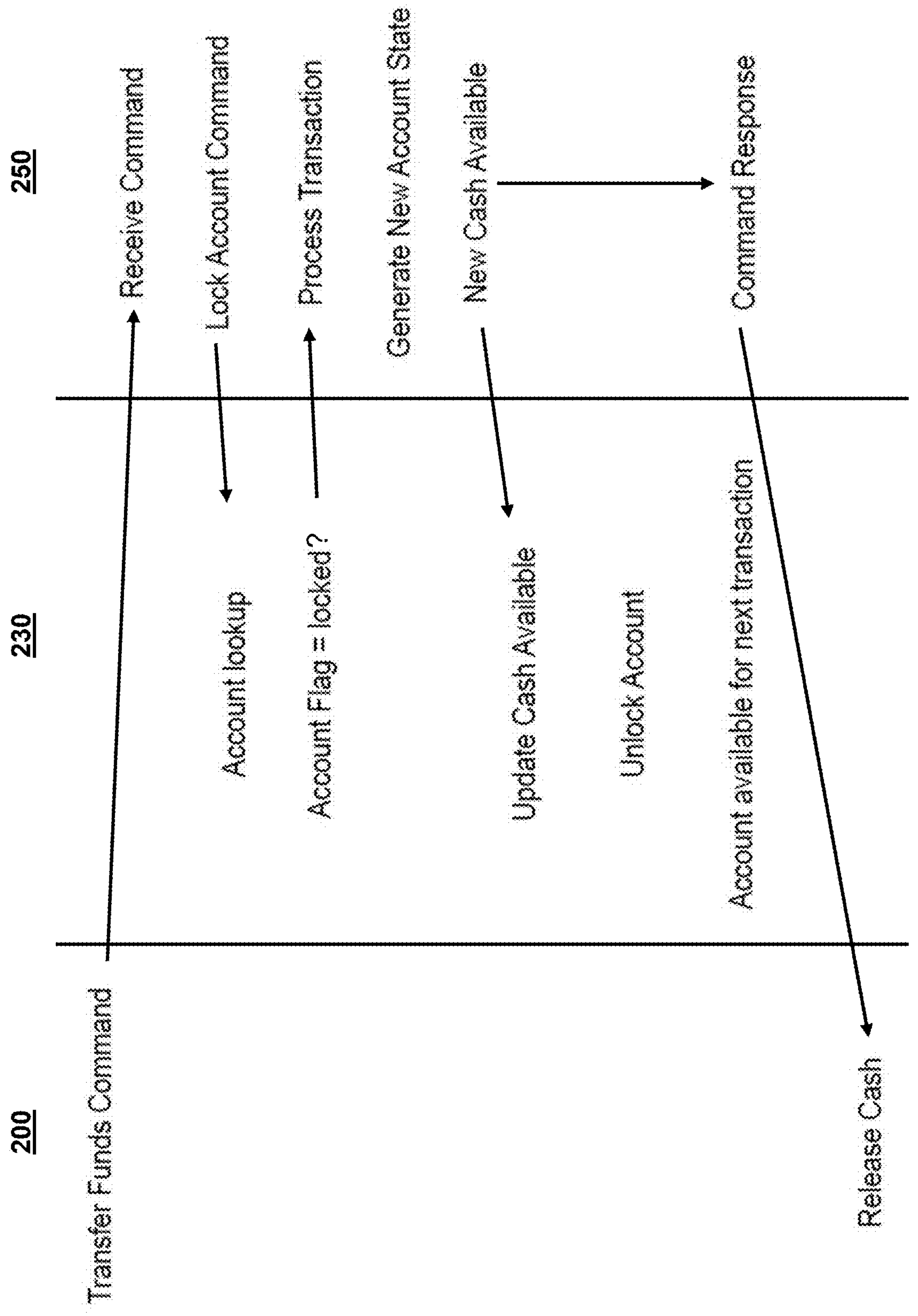

FIGS. 2A-B show an illustrative diagram for API subroutine workflows. For example, FIG. 2A shows an illustrative diagram for an API subroutine for simple tasks. As one example, FIG. 2A may show a process for a request cash command (e.g., via an automated teller machine and/or a digital payment apps that allow users to send and receive money). FIG. 2A shows how this is designated a simple function and routed to a first API subroutine.

For example, the system may receive a request from API user 200. The system may determine to route the request to microservice 230, which houses a simple API subroutine. As microservice 230, the simple API routine may perform an account lookup and perform simple functions. For example, the simple API routine may determine whether a requested amount is less than available funds. The system may then determine whether an account is locked (e.g., via the presence of a flag indicating that the account is lock). By locking the account, the system may ensure that there is no "double spend problem" encountered.

For example, microservice 230 performs a simple API subroutine by executing efficient and focused tasks designed to respond quickly to incoming requests. When the system receives a request from API user 200, it analyzes the request and determines that it should be routed to microservice 230 for handling. Microservice 230, which is specifically optimized for simple operations, then initiates the simple API subroutine. For instance, this subroutine could involve an account lookup to perform essential financial checks, such as verifying whether a requested transaction amount is less than the available balance in an account. The subroutine quickly queries the account details, retrieves the balance, and performs the comparison to determine if the transaction can proceed.

Additionally, the subroutine may check for any security or status flags on the account, such as an indicator showing that the account is locked. If a lock flag is present, it signifies that the account has been restricted, and no transactions can be processed until it is unlocked. This locking mechanism is critical for preventing issues like the "double spend problem," where the same funds could be allocated to multiple transactions simultaneously. By implementing a lock before processing any transaction, the system ensures that the account's balance remains consistent and secure. Once the checks are complete, the microservice can return a response to the API user, either authorizing the transaction or rejecting it based on the account status and balance verification. This approach ensures that simple but essential operations are carried out efficiently, maintaining the system's overall integrity and reliability.

Microservice 230 may then release cash in response to the initial request. The system may also transmit a command to a second API subroutine (e.g., handling complex tasks) to update ledger 250. Ledger 250 may then process the payment, generate a new account state, and determine a new cash amount that is available. Microservice 230 may then update a cash available unlock and account and await another request. For example, microservice 230 releases cash in response to the initial request by executing a carefully coordinated process that ensures data integrity and system consistency. Once the initial request from API user 200 has been verified—for instance, by confirming that the requested amount is less than the available funds and that the account is not locked-microservice 230 initiates the cash release. This involves executing commands to authorize the transaction, such as unlocking the necessary amount of funds for disbursement. To ensure that all financial records are accurately updated, microservice 230 then communicates with a second API subroutine designed to handle more complex tasks, including updates to the digital ledger.

The second API subroutine transmits a command to ledger 250, which is responsible for processing the payment. Ledger 250 generates a new account state, updates the transaction history, and recalculates the available cash balance. This ensures that the financial data is accurate and reflects the completed transaction. Once ledger 250 has processed these updates and confirmed the new account state, microservice 230 receives this confirmation and finalizes the transaction by unlocking the funds. The cash is then marked as available, and the system updates the account status, signaling that it is ready to handle another request. This process ensures that all financial operations are recorded securely, prevents issues like double spending, and keeps the system prepared for subsequent transactions, maintaining both efficiency and reliability.

FIG. 2B shows an illustrative diagram for an API subroutine for complex tasks. For example, API user 200 may transmit a complex task (e.g., a transfer funds command). The system may determine to transmit this request (or relay this request) to ledger 250. Ledger 250 may receive the command and determine whether an account is locked (e.g., by querying microservice 230). Upon determining that the account is not locked the system may process the transaction, generate a new account state, and determine a new amount of cash available. The system may then update the cash available at microservice 230, which maintains the account as unlocked and available for a new request, while simultaneously generating a response to the initial request (e.g., to release cash).

When the system handles a complex task, such as a transfer of funds command from API user 200, it orchestrates a series of coordinated actions across different components to ensure the operation is processed accurately and securely. Upon receiving the complex task, the system first determines that the request needs to be relayed to a component capable of handling such complexity, such as ledger 250. Ledger 250 is responsible for performing more intensive operations, including verifying account states and updating financial records. As part of this process, ledger 250 may query microservice 230 to check if the account involved in the transaction is locked. This query ensures that no other conflicting operations are being processed simultaneously, safeguarding against issues like double spending.

If ledger 250 confirms, via the response from microservice 230, that the account is not locked, it proceeds to process the transaction. This involves debiting and crediting the respective accounts, recalculating the available balances, and generating a new account state. Once the transaction is successfully processed and the new cash amount is determined, ledger 250 updates microservice 230 with the revised account details. Microservice 230 then reflects the new cash balance, ensuring the account is unlocked and ready to handle subsequent requests. Simultaneously, the system generates a response to API user 200, confirming that the transaction has been completed and, if necessary, authorizing the release of cash or updating the status of the funds. This coordinated approach ensures that complex tasks are executed efficiently, while maintaining data integrity and allowing the system to remain responsive for future operations.

Figure 3:
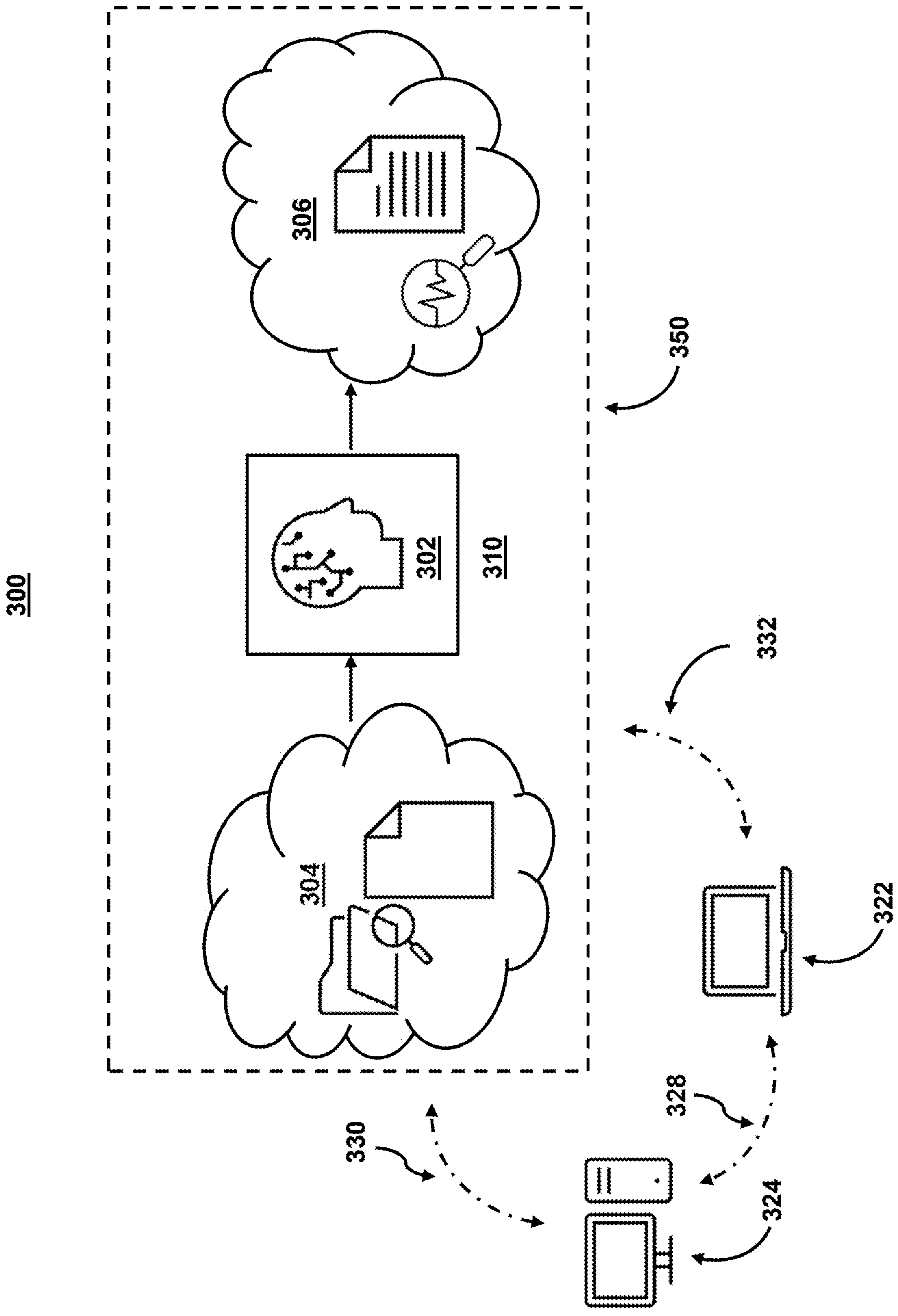
FIG. 3 shows illustrative components for a system used to facilitate bifurcated API subroutines, in accordance with one or more embodiments.

FIG. 3 shows illustrative components for a system used to facilitate bifurcated API subroutines, in accordance with one or more embodiments. For example, FIG. 3 may show illustrative components for processing serial communications using bifurcated API subroutines. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

In some embodiments, system 300 and/or one or more models herein may be implemented using an application specific integrated circuit. An integrated circuit may be a small electronic device made of semiconductor material, typically silicon, that contains a large number of microscopic electronic components such as transistors, resistors, capacitors, and diodes. These components are interconnected to perform a specific function or set of functions. Integrated circuits can be classified into various types based on their functionality, such as analog, digital, and mixed-signal ICs. The transistors within an IC are the primary building blocks, as they act as switches or amplifiers for electronic signals. The other components, like resistors and capacitors, are used for controlling voltage, current, and timing within the circuit. System 300 may design the integrated circuit to be application specific such that design of the circuit is customized for a given application. In some embodiments, system 300 may use an integrated circuit system where one or more integrated circuit are spread throughout a system, network, and/or one or more devices. In such case, the system design may ensure that the circuits are integrated with other electronic components like connectors, power supplies, and sensors to form a complete and functional electronic system. This integration allows for the implementation of sophisticated tasks in devices needed for one or more specified applications.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include model 302, which may be a machine learning model, artificial intelligence model, etc. (which may be referred collectively as "models" herein). In recent years, the use of artificial intelligence, including, but not limited to, machine learning, deep learning, etc. (referred to collectively herein as artificial intelligence models, machine learning models, or simply models) has exponentially increased. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations. However, despite these benefits and despite the wide-ranging number of potential applications, practical implementations of artificial intelligence have been hindered by several technical problems. First, artificial intelligence may rely on large amounts of high-quality data. The process for obtaining this data and ensuring it is high-quality can be complex and time-consuming. Additionally, data that is obtained may need to be categorized and labeled accurately, which can be difficult, time-consuming and a manual task. Second, despite the mainstream popularity of artificial intelligence, practical implementations of artificial intelligence may require specialized knowledge to design, program, and integrate artificial intelligence-based solutions, which can limit the amount of people and resources available to create these practical implementations. Finally, results based on artificial intelligence can be difficult to review as the process by which the results are made may be unknown or obscured. This obscurity can create hurdles for identifying errors in the results, as well as improving the models providing the results.

Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., a routing for a function, a determination of the complexity of the function, a status of an account, etc.).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., a routing for a function, a determination of the complexity of the function, a status of an account, etc.).

In some embodiments, the model (e.g., model 302) may automatically perform actions based on outputs 306. In some embodiments, the model (e.g., model 302) may not perform any actions. The output of the model (e.g., model 302) may be used to process serial communications using bifurcated application interface programming (API) subroutines.

In some embodiments, the system may generate predictions related to financial services. For example, the system may use one or more models and/or application to process a variety of data to generate predictions for tasks such as payment card eligibility determinations, fraud detection, and/or determining rates for auto-finance applications. For credit card eligibility, the model may use data such as the applicant's credit score, income, employment history, debt-to-income ratio, and past credit history. This data helps the model predict the likelihood of the applicant repaying the credit card debt. For fraud detection, models analyze transaction data, including the amount, location, frequency, and pattern of transactions. They compare these patterns to known fraudulent behavior to identify potentially fraudulent activities. For determining auto-finance rates, models might use the applicant's credit score, loan amount, loan term, vehicle details, and market interest rates. The data used by these models comes from various sources, including credit bureaus, financial institutions, customer-provided information, transaction records, and public records. By analyzing these data points, models can make informed predictions and decisions that help financial institutions manage risk, provide appropriate services, and enhance customer satisfaction.

In some embodiments, the model may process received data through several stages. For example, the model may collect and aggregate data from various sources (e.g., a user account, industry data, third-party data sources, etc.). The system may ensure the data is cleaned and preprocessed to handle any missing and/or inconsistent information. This preprocessing may include normalizing numerical data, encoding categorical variables, and applying techniques to handle outliers. The model may then use feature engineering to identify and create relevant features that can improve its predictive power. For instance, the system may derive new variables from existing ones, such as calculating the debt-to-income ratio from debt and income data.

Once the data is prepared, the system feeds the data into the model, which could be an artificial intelligence algorithm such as logistic regression, decision trees, and/or neural networks. The model may be trained on historical data, learning patterns, and/or relationships between input features and the target outcomes. During this training process, the system may adjust the model parameters to minimize prediction errors. After training, the system may validate the model and test the model using separate data sets to ensure the model has a predetermined and/or threshold accuracy and generalizability.

In some embodiments, the system may use specialized predictions based on the task. Additionally or alternatively, the system may adjust the inputs and/or outputs based on the determinations and/or predictions required. For example, for credit card eligibility, the model may evaluate the applicant's likelihood of defaulting on payments. In fraud detection, the model may identify anomalies and patterns indicative of fraudulent behavior. In auto-finance rate determination, the model may predict the risk associated with lending to an individual and adjusts the interest rates accordingly. In some embodiments, the entire process may be iterative, with models continually updated and refined as new data becomes available, ensuring they remain effective in making accurate and reliable predictions.

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDoS protection, and API layer 350 may use RESTful APIs as standard for external integration.

Figure 4:
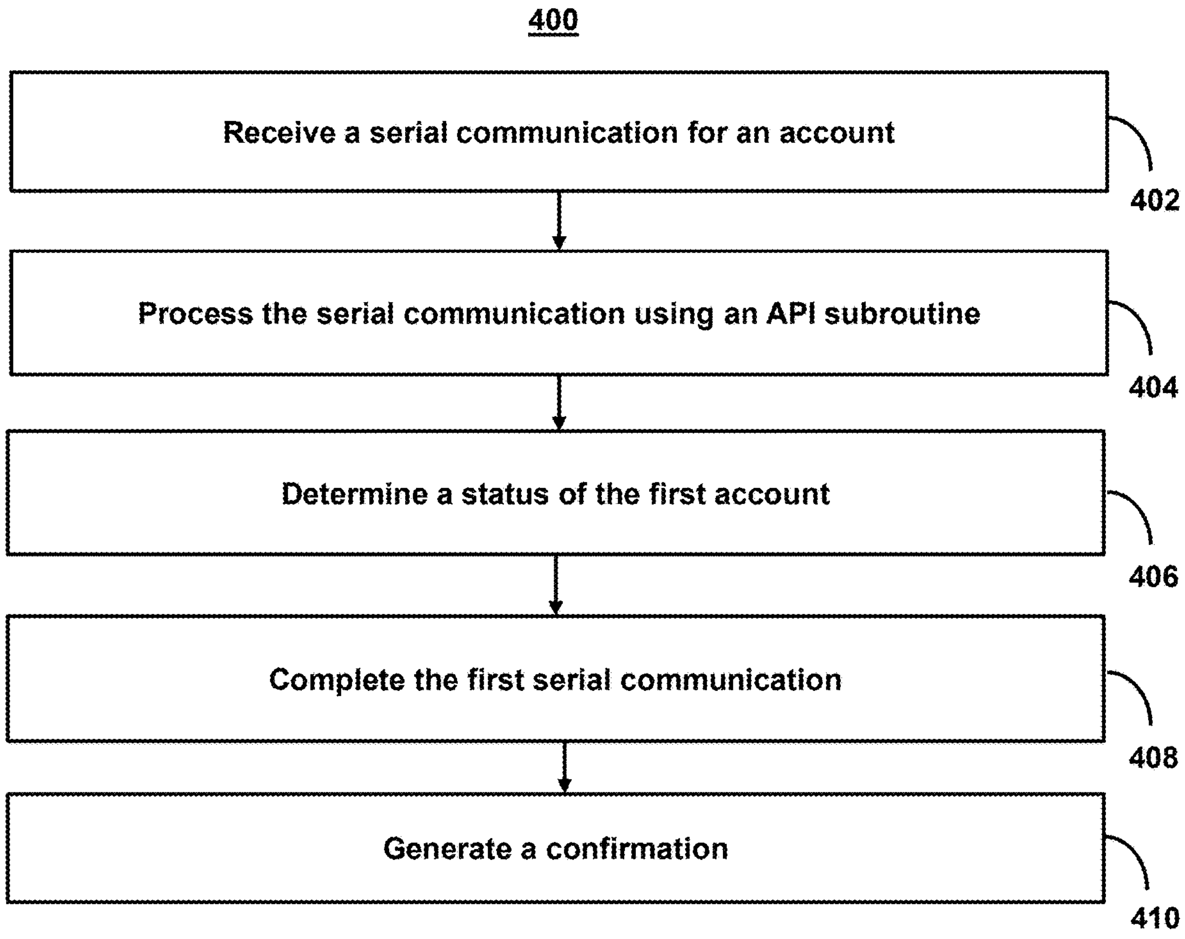
FIG. 4 shows a flowchart of the steps involved in processing serial communications, in accordance with one or more embodiments.

FIG. 4 shows a flowchart of the steps involved in processing serial communications, in accordance with one or more embodiments. For example, the system may use process 400 (e.g., as implemented on one or more system components described above) in order to process serial communications using bifurcated API subroutines.

At step 402, process 400 (e.g., using one or more components described above) receives a serial communication for an account. For example, the system may receive, via a bifurcated serial communication processing API, a first serial communication for a first account, wherein the bifurcated serial communication processing API adds a first subroutine identifier to the first serial communication based on a first function for completing. When a system receives a serial communication for an account, it does so through a bifurcated serial communication processing API designed to handle various types of requests efficiently. For instance, when a first serial communication related to a first account is received, the API processes the communication and determines the nature of the task based on predefined criteria. The bifurcated API then adds a first subroutine identifier to the serial communication. This identifier specifies which subroutine or processing path should handle the communication, depending on whether the task is simple or complex. The subroutine identifier allows the API to categorize and route the communication appropriately. For example, if the function to be completed is straightforward, such as checking the account balance or validating transaction details, the communication may be routed to a subroutine optimized for high-speed, lightweight operations. Conversely, if the function involves more complex processing, such as executing a large transaction or updating multiple account records, the communication is directed to a more sophisticated processing path or microservices that manage resource-intensive tasks. This bifurcated approach ensures that each communication is processed efficiently, balancing the workload and maintaining optimal performance across the system.

In some embodiments, the bifurcated serial communication processing API adds the first subroutine identifier to the first serial communication by dynamically assigning an appropriate label based on the specific function requested by the user. When the system receives a user request from a first user to perform a particular operation—such as an account balance check or a simple transaction—the API analyzes the request to determine the type and complexity of the function that needs to be executed. The API is programmed to distinguish between simple and complex tasks, categorizing the request accordingly. Upon identifying that the requested operation is a simple function that can be handled efficiently, the API annotates the first serial communication with a first subroutine identifier. This identifier acts as a label or marker that routes the communication to the designated first API subroutine, which is optimized for executing basic operations quickly and with minimal resource consumption. By tagging the communication with this identifier, the API ensures that the serial communication is processed through the appropriate path, maintaining an efficient workflow and allowing for rapid execution. This process of annotating the serial communication with the subroutine identifier streamlines the handling of user requests and ensures that each communication is directed to the correct processing unit based on its specific requirements.

In some embodiments, the bifurcated serial communication processing API adds the first subroutine identifier based on the first function of the first serial communication by determining a type of the first function, determining that the type corresponds to the first API subroutine, and determining to add the first subroutine identifier to the first serial communication based on determining that the type corresponds to the first API subroutine. For example, the bifurcated serial communication processing API adds the first subroutine identifier to the first serial communication through a systematic process that involves analyzing the nature of the requested function. When the first serial communication is received, the API begins by determining the type of the first function specified in the request. This step involves assessing the complexity and requirements of the function, such as whether it is a straightforward task like a simple data retrieval or a basic validation check. The API uses preconfigured criteria to classify the function type and decide how it should be handled. Once the type of the function is determined, the API checks whether this type corresponds to the first API subroutine, which is designed for simple, high-speed operations. If the function is categorized as a basic task that can be efficiently processed with minimal computational effort, the API makes the decision to route the communication to the first subroutine. Consequently, the API annotates the serial communication by adding the first subroutine identifier, a label that directs the communication to the appropriate processing path. By adding this identifier, the API ensures that the request is handled by the optimized subroutine, enabling rapid execution and efficient resource allocation. This process of determining the function type, mapping it to the correct subroutine, and adding the corresponding identifier ensures that each communication is processed effectively according to its requirements.

In some embodiments, the bifurcated serial communication processing API adds the first subroutine identifier based on the first function of the first serial communication by determining a frequency of the first function, determining that the frequency corresponds to the first API subroutine, and determining to add the first subroutine identifier to the first serial communication based on determining that the frequency corresponds to the first API subroutine. For example, the bifurcated serial communication processing API can add the first subroutine identifier to the first serial communication by taking into account the frequency of the requested function. When the API receives the first serial communication, it evaluates not only the nature of the function but also how often this type of function is performed. The system keeps track of function frequencies, recognizing which operations are commonly requested and often require quick processing. By analyzing the frequency, the API can classify the function as one that is high-frequency, indicating it is a routine operation that should be handled swiftly and efficiently. Once the API determines that the frequency of the first function aligns with operations best managed by the first API subroutine, it decides to route the communication accordingly. High-frequency functions, which are typically simple and repetitive, are mapped to the first subroutine to ensure they are executed rapidly without causing delays. Based on this analysis, the API adds the first subroutine identifier to the serial communication. This identifier serves as a directive that routes the request to the optimized path for handling frequent and lightweight operations. By incorporating frequency-based logic into its routing decisions, the API enhances performance, prioritizing high-demand functions for efficient processing and maintaining system responsiveness.

In some embodiments, the bifurcated serial communication processing API add the first subroutine identifier based on the first function of the first serial communication by determining an encryption requirement of the first function, determining that the encryption requirement corresponds to the first API subroutine, and determining to add the first subroutine identifier to the first serial communication based on determining that the encryption requirement corresponds to the first API subroutine. For example, the bifurcated serial communication processing API adds the first subroutine identifier to the first serial communication by evaluating the encryption requirement of the function. When the API receives the serial communication, it assesses the security needs associated with the requested operation, specifically looking at whether encryption is required for data protection. The system analyzes whether the communication demands a minimal or standard level of encryption, suitable for simple operations that do not involve sensitive or highly confidential data. If the encryption requirement is basic and matches the security capabilities of the first API subroutine, the API categorizes the communication as one that can be handled by this optimized subroutine. After determining that the encryption requirement corresponds to the first API subroutine, which is equipped to manage functions with standard encryption protocols efficiently, the API decides to annotate the serial communication with the first subroutine identifier. This identifier indicates that the communication should be routed to the first subroutine, which processes simple and lightly encrypted tasks quickly and securely. By considering encryption requirements as part of the decision-making process, the API ensures that communications are directed to the appropriate processing path, balancing security needs with performance. This method allows the system to maintain both efficiency and data protection, appropriately routing requests based on their encryption specifications.

At step 404, process 400 (e.g., using one or more components described above) processes the serial communication using an API subroutine. For example, the system may process the first serial communication using a first API subroutine based on the first subroutine identifier, wherein the first API subroutine comprises an account locking function. When a system processes a serial communication using an API subroutine, it does so by leveraging the subroutine identifier that specifies how the communication should be handled. For example, if a first serial communication is received and assigned a first subroutine identifier that directs it to a specific API subroutine, the system routes the communication accordingly. The first API subroutine is designed to perform a set of operations tailored to the communication's requirements. One of these operations may include an account locking function, which ensures the security and integrity of the account during the processing of the communication. Upon receiving the serial communication, the first API subroutine initiates the account locking function to prevent any simultaneous or conflicting actions from being performed on the account. This locking mechanism ensures that no other transactions or updates can be made until the current operation is completed, preventing issues like double spending or data inconsistencies. The API subroutine then carries out the requested task, such as verifying available funds, processing a transaction, or updating account details. Once the operation is completed successfully, the subroutine may release the account lock, making the account available for future communications. By using specialized API subroutines with functions like account locking, the system ensures that each serial communication is processed securely and efficiently, maintaining data integrity and consistency throughout.

In some embodiments, the system processes the first serial communication using the first API subroutine by accessing a first microservice and using the first microservice to complete the first API subroutine. For example, the system processes the first serial communication using the first API subroutine by interacting with a dedicated microservice designed for handling simple and efficient operations. When the first serial communication is routed to the first API subroutine, the subroutine engages the first microservice, which is optimized to execute the required tasks rapidly. The first microservice is configured to handle specific functions associated with the subroutine, such as performing quick data retrievals, running validation checks, or executing straightforward computations. To complete the first API subroutine, the system sends the necessary data and instructions from the serial communication to the first microservice. The microservice then processes the request, using its specialized capabilities to perform the task efficiently. For example, if the subroutine involves checking an account balance or verifying a flag, the microservice retrieves the relevant information, executes the operation, and returns the results to the API. Once the microservice has completed the task, the first API subroutine finalizes the processing of the serial communication, either generating a response for the user or preparing the system for the next communication. This approach leverages the microservice's ability to handle simple functions independently, ensuring that the system remains responsive and can quickly process high-priority requests.

In some embodiments, the system processes the first serial communication using the first API subroutine by generating routing instructions for a first microservice and executing the routing instructions. For example, the system processes the first serial communication using the first API subroutine by creating specific routing instructions that direct the communication to the appropriate first microservice. When the first serial communication is received and identified as a task suitable for the first API subroutine, the system generates a set of routing instructions. These instructions specify how the communication should be handled, including details such as the destination microservice, the type of operation to perform, and any parameters or data needed for the task. The generated routing instructions are then executed by the system, which forwards the serial communication to the designated first microservice. The microservice receives the instructions and processes the communication accordingly, carrying out the necessary operations such as retrieving account details, validating a request, or performing a simple calculation. By executing the routing instructions, the system ensures that the communication is handled efficiently and accurately, leveraging the microservice's specialized functionality. Once the microservice completes the task, the results are returned to the first API subroutine, which finalizes the processing of the serial communication and prepares the system for subsequent requests. This method allows the system to maintain a streamlined workflow and optimize performance by effectively routing tasks to the appropriate microservices.

At step 406, process 400 (e.g., using one or more components described above) determines a status of the first account. For example, the system may determine a status of the first account based on the account locking function. A system determines the status of the first account by using the account locking function embedded within the API subroutine responsible for processing the serial communication. When a communication related to the first account is received and routed to the appropriate API subroutine, the system checks the status of the account by querying the account locking function. This function assesses whether the account is currently locked or unlocked, which indicates whether the account is available for further transactions or if it is temporarily restricted due to an ongoing operation. The account locking function works by checking for flags or indicators associated with the account. If the function detects that the account is locked, it may indicate that a transaction is still being processed, or security measures have been enforced to prevent any changes. Conversely, if the account is unlocked, it signifies that the account is in a normal state and available for new transactions or updates. This status determination is critical for maintaining data integrity and ensuring that operations are carried out in a safe and controlled manner. By continuously monitoring and updating the account status, the system can manage concurrent communications effectively and prevent issues such as double spending or unauthorized access.

In some embodiments, the system determines the status of the first account based on the account locking function by determining whether the first account is currently processing another serial communication, and, in response to determining that the first account is not currently processing another serial communication, determining not to activate the account locking function, wherein the status is further based on the account locking function not being active. For example, the system determines the status of the first account using the account locking function by checking whether the account is currently engaged in processing another serial communication. When a new request or communication is received, the system queries the account locking function to see if there is any active lock indicating that the account is already involved in an ongoing operation. This involves verifying whether any flags or indicators have been set to signal that the account is locked due to the processing of another communication. If the system determines that the account is not currently processing another communication and no active locks are present, it concludes that the account is free and available for new operations. In response to confirming that the account is not engaged with another serial communication, the system decides not to activate the account locking function. This means that the account remains unlocked and in a status that permits additional communications or transactions to proceed. The status of the first account is therefore based on the inactivity of the locking function, signaling that the account is in an accessible and ready state. By using this mechanism, the system ensures efficient management of serial communications, only locking the account when necessary to maintain data integrity and prevent conflicts, while allowing new operations when the account is not occupied.

In some embodiments, the system determines the status of the first account by determining an account identifier for the first account and determining whether a required identifier for the first serial communication corresponds to the account identifier. For example, the system determines the status of the first account by first identifying the account identifier associated with it. When the first serial communication is received, the system extracts or references the account identifier, which serves as a unique marker to specify which account the communication pertains to. It then compares this account identifier with the required identifier embedded within the first serial communication. The required identifier is a security or validation element that ensures the communication is properly authorized and corresponds to the correct account. If the system determines that the required identifier within the serial communication matches the account identifier, it confirms that the communication is valid and authorized to proceed. This validation step ensures that the communication is intended for the specified account and prevents unauthorized access or processing errors. The system then uses this confirmation to further assess the status of the account, such as whether it is locked, available, or requires additional security measures. By verifying that the identifiers correspond, the system ensures secure and accurate processing of the communication, maintaining data integrity and proper account handling.

In some embodiments, the system determines the status of the first by determining an account balance for the first account and determining whether a requirement for the first serial communication corresponds to the account balance. The system determines the status of the first account by retrieving the account balance and assessing whether it meets the requirements specified in the first serial communication. When the communication is received, the system queries the relevant data source or database to obtain the current balance of the first account. This balance reflects the available funds or resources that can be used for the requested operation. The system then compares the account balance to the requirement stated in the serial communication, such as a specified amount needed to complete a transaction or authorize a payment. If the account balance meets or exceeds the requirement, the system determines that the account is in a status that allows the communication to proceed. Conversely, if the account balance is insufficient, the system updates the status to reflect that the requirement cannot be met, potentially preventing the operation from continuing or triggering a rejection response. By using this comparison, the system ensures that only authorized and feasible operations are carried out, safeguarding against overdrafts, resource allocation errors, or unauthorized transactions. This method maintains financial integrity and ensures that account operations align with the account's actual available balance.

At step 408, process 400 (e.g., using one or more components described above) completes the first serial communication. For example, the system may, in response to determining that the status corresponds to completing the first serial communication, complete the first serial communication. The system completes the first serial communication by following a sequence of steps that ensure the communication is fully processed and any necessary operations are finalized. Once the system has determined the status of the first account, typically using the account locking function, it checks whether the account status allows for the requested operation to proceed. If the status corresponds to a state that permits completion—such as the account being unlocked and no conflicts detected—the system continues to execute the final steps of the communication process. The system then carries out the necessary operations associated with the first serial communication. This may involve updating account balances, recording the transaction in the ledger, or generating a confirmation message. If the operation involves a financial transaction, the system ensures that funds are correctly debited or credited and that the account state is accurately updated. Once all tasks related to the communication have been successfully executed, the system marks the communication as complete. It may then unlock the account if it was previously locked, making it available for future transactions or communications. Finally, the system may generate a response to the initiating API user, confirming that the first serial communication has been processed and completed. This structured approach ensures data consistency, system reliability, and secure processing of communications.

At step 410, process 400 (e.g., using one or more components described above) generates a confirmation. For example, the system may generate for display, on a user interface, a first confirmation based on completing the first serial communication. The system generates a confirmation by creating a structured and informative message that reflects the successful completion of the first serial communication. Once the requested operations, such as updating account balances or processing a transaction, have been fully executed, the system compiles the relevant details into a confirmation message. This message typically includes important information such as the transaction ID, the date and time of completion, the amount involved (if applicable), the updated account status, and any other pertinent details that provide transparency and assurance to the user. To make this confirmation accessible, the system prepares it for display on a user interface. It formats the information in a clear and user-friendly way, often using visual cues such as green check marks or success banners to indicate that the operation was completed without issues. The confirmation message is then transmitted to the user interface, where it is displayed for the user's review. This ensures that the user is promptly informed of the completed action and can verify that the intended operation has been successfully processed. By generating and displaying confirmations, the system provides real-time feedback, enhances user trust, and maintains a transparent record of completed communications.

In some embodiments, the system may further receive, via the bifurcated serial communication processing API, a second serial communication for the first account, wherein the bifurcated serial communication processing API adds a second subroutine identifier to the second serial communication based on a second function for completing, process the second serial communication using a second API subroutine based on the second subroutine identifier, and query the account locking function in the first API subroutine to determine whether to complete the second serial communication. The system may then receive a response to querying the account locking function in the first API subroutine, determining that the first account is not locked based on the response, and determining to complete the second function using the second API subroutine based on determining that the first account is not locked. Alternatively, the system may receive a response to querying the account locking function in the first API subroutine, determine that the first account is locked based on the response, and in response to determining that the first account is locked terminating the second API subroutine prior to completing the second function.

For example, when the system needs to process additional communications, it continues to operate through the bifurcated serial communication processing API, which handles incoming requests in an efficient and organized manner. For instance, when the system receives a second serial communication related to the first account, the API assigns a second subroutine identifier to this communication, determining which specific function needs to be executed. This second subroutine identifier directs the communication to a second API subroutine optimized for completing the required task. Before proceeding, the second API subroutine must first ensure that the account status allows the operation to take place.

To check the account status, the second API subroutine queries the account locking function in the first API subroutine. This query determines whether the first account is currently locked or unlocked, ensuring that no simultaneous or conflicting operations could compromise the account's integrity. If the system receives a response indicating that the account is not locked, it confirms that the account is available, and the second API subroutine proceeds to complete the second function. The subroutine carries out the necessary operations, such as updating data or performing another financial transaction, and ensures everything is processed securely and accurately.

Alternatively, if the system receives a response indicating that the first account is locked, it recognizes that an ongoing operation is still in progress or that there are restrictions preventing further actions. In this case, the system terminates the second API subroutine before attempting to complete the second function, effectively preventing any data conflicts or processing errors. This approach ensures that all serial communications are managed in a way that maintains the system's reliability, prevents resource contention, and ensures data consistency across different operations. By efficiently handling these scenarios, the system remains robust and responsive, capable of managing multiple communications while preserving data integrity.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for processing serial communications using bifurcated application interface programming (API) subroutines.
2. The method of the preceding embodiment, further comprising: receiving, via a bifurcated serial communication processing API, a first serial communication for a first account, wherein the bifurcated serial communication processing API adds a first subroutine identifier to the first serial communication based on a first function for completing; processing the first serial communication using a first API subroutine based on the first subroutine identifier, wherein the first API subroutine comprises an account locking function; determining a status of the first account based on the account locking function; in response to determining that the status corresponds to completing the first serial communication, completing the first serial communication; and generating for display, on a user interface, a first confirmation based on completing the first serial communication.
3. The method of claim 2, further comprising: receiving, via the bifurcated serial communication processing API, a second serial communication for the first account, wherein the bifurcated serial communication processing API adds a second subroutine identifier to the second serial communication based on a second function for completing; processing the second serial communication using a second API subroutine based on the second subroutine identifier; and querying the account locking function in the first API subroutine to determine whether to complete the second serial communication.
4. The method of claim 3, further comprising: receiving a response to querying the account locking function in the first API subroutine; determining that the first account is not locked based on the response; and determining to complete the second function using the second API subroutine based on determining that the first account is not locked.
5. The method of claim 3, further comprising: receiving a response to querying the account locking function in the first API subroutine; determining that the first account is locked based on the response; and in response to determining that the first account is locked terminating the second API subroutine prior to completing the second function.
6. The method of claim 3, wherein the first API subroutine is completed in under 50 milliseconds, and wherein the second API subroutine is completed in over 50 milliseconds.
7. The method of claim 3, wherein the first API subroutine is completed in under 50 milliseconds, and wherein the second API subroutine is completed in over 100 milliseconds.
8. The method of claim 3, wherein the first API subroutine is completed in under 25 milliseconds, and wherein the second API subroutine is completed in over 150 milliseconds.
9. The method of claim 2, wherein the bifurcated serial communication processing API adds the first subroutine identifier based on the first function of the first serial communication by: receiving, via the bifurcated serial communication processing API, a user request from a first user to perform the first function; and in response to receiving the user request, annotating the first serial communication with the first subroutine identifier.

10. The method of claim 2, wherein the bifurcated serial communication processing API adds the first subroutine identifier based on the first function of the first serial communication by: determining a type of the first function; determining that the type corresponds to the first API subroutine; and determining to add the first subroutine identifier to the first serial communication based on determining that the type corresponds to the first API subroutine.

11. The method of claim 2, wherein the bifurcated serial communication processing API adds the first subroutine identifier based on the first function of the first serial communication by: determining a frequency of the first function; determining that the frequency corresponds to the first API subroutine; and determining to add the first subroutine identifier to the first serial communication based on determining that the frequency corresponds to the first API subroutine.

12. The method of claim 2, wherein the bifurcated serial communication processing API adds the first subroutine identifier based on the first function of the first serial communication by: determining an encryption requirement of the first function; determining that the encryption requirement corresponds to the first API subroutine; and determining to add the first subroutine identifier to the first serial communication based on determining that the encryption requirement corresponds to the first API subroutine.

13. The method of claim 2, wherein determining the status of the first account based on the account locking function further comprises: determining whether the first account is currently processing another serial communication; in response to determining that the first account is not currently processing another serial communication; and determining not to activate the account locking function, wherein the status is further based on the account locking function not being active.

14. The method of claim 2, wherein determining the status of the first account is further based on: determining an account balance for the first account; and determining whether a requirement for the first serial communication corresponds to the account balance.

15. The method of claim 2, wherein determining the status of the first account is further based on: determining an account balance for the first account; and determining whether a requirement for the first serial communication corresponds to the account balance.

16. The method of claim 2, wherein processing the first serial communication using the first API subroutine comprises: accessing a first microservice; and using the first microservice to complete the first API subroutine.

17. The method of claim 2, wherein processing the first serial communication using the first API subroutine comprises: accessing a first microservice; and using the first microservice to complete the first API subroutine.

18. One or more non-transitory, computer-readable mediums storing instructions that, when executed by a data processing apparatus, cause the data processing apparatus to perform operations comprising those of any of embodiments 1-17.

19. A system comprising one or more processors; and memory storing instructions that, when executed by the processors, cause the processors to effectuate operations comprising those of any of embodiments 1-17.

20. A system comprising means for performing any of embodiments 1-17.

What is claimed is:

1. A system for processing encrypted serial communications using secured bifurcated application interface programming (API) subroutines over an encrypted computer network, the system comprising:

one or more processors; and one or more non-transitory, computer-readable mediums comprising instructions that, when executed by the one or more processors, cause operations comprising:

receiving, from a first secured network location, an encrypted request for access to a bifurcated serial communication processing API;

in response to the encrypted request, transmitting the bifurcated serial communication processing API to the first secured network location;

receiving, via the bifurcated serial communication processing API, a first serial communication, wherein the bifurcated serial communication processing API adds a first subroutine identifier to the first serial communication based on a first function for completing;

receiving, via the bifurcated serial communication processing API, a second serial communication, wherein the bifurcated serial communication processing API adds a second subroutine identifier to the second serial communication based on a second function for completing;

processing the first serial communication using a first API subroutine based on the first subroutine identifier, wherein the first API subroutine comprises an account locking function; and processing the second serial communication using a second API subroutine based on the second subroutine identifier, wherein the second API subroutine queries the account locking function in the first API subroutine to determine whether to complete the second serial communication.

2. A method for processing encrypted serial communications using secured bifurcated application interface programming (API) subroutines, the method comprising:

receiving, via a bifurcated serial communication processing API, a first serial communication for a first account;

determining an encryption requirement of a first function of the first serial communication;

determining that the encryption requirement corresponds to a first API subroutine;

determining to add a first subroutine identifier to the first serial communication based on determining that the encryption requirement corresponds to the first API subroutine;

processing the first serial communication using the first API subroutine based on the first subroutine identifier, wherein the first API subroutine comprises an account locking function;

determining a status of the first account based on the account locking function;

in response to determining that the status corresponds to completing the first serial communication, completing the first serial communication; and generating for display, on a user interface, a first confirmation based on completing the first serial communication.

3. The method of claim 2, further comprising:

receiving, via the bifurcated serial communication processing API, a second serial communication for the first account, wherein the bifurcated serial communication processing API adds a second subroutine identifier to the second serial communication based on a second function for completing;

processing the second serial communication using a second API subroutine based on the second subroutine identifier; and querying the account locking function in the first API subroutine to determine whether to complete the second serial communication.

4. The method of claim 3, further comprising:

receiving a response to querying the account locking function in the first API subroutine;

determining that the first account is not locked based on the response; and determining to complete the second function using the second API subroutine based on determining that the first account is not locked.

5. The method of claim 3, further comprising:

receiving a response to querying the account locking function in the first API subroutine;

determining that the first account is locked based on the response; and in response to determining that the first account is locked terminating the second API subroutine prior to completing the second function.

6. The method of claim 3, wherein the first API subroutine is completed in under 50 milliseconds, and wherein the second API subroutine is completed in over 50 milliseconds.

7. The method of claim 3, wherein the first API subroutine is completed in under 50 milliseconds, and wherein the second API subroutine is completed in over 100 milliseconds.

8. The method of claim 3, wherein the first API subroutine is completed in under 25 milliseconds, and wherein the second API subroutine is completed in over 150 milliseconds.

9. The method of claim 2, further comprising:

receiving, via the bifurcated serial communication processing API, a user request from a first user to perform an additional function; and in response to receiving the user request, annotating the first serial communication with an additional subroutine identifier.

10. The method of claim 2, further comprising:

determining a type of an additional function;

determining that the type corresponds to an additional API subroutine; and determining to add an additional subroutine identifier to the first serial communication based on determining that the type corresponds to the additional API subroutine.

11. The method of claim 2, further comprising:

determining a frequency of an additional function;

determining that the frequency corresponds to an additional API subroutine; and determining to add the first subroutine identifier to the first serial communication based on determining that the frequency corresponds to the additional API subroutine.

12. The method of claim 2, wherein determining the status of the first account based on the account locking function further comprises:

determining whether the first account is currently processing a different serial communication; and in response to determining that the first account is not currently processing the different serial communication, determining not to activate the account locking function, wherein the status is further based on the account locking function not being active.

13. The method of claim 2, wherein determining the status of the first account is further based on:

determining an account identifier for the first account; and determining whether a required identifier for the first serial communication corresponds to the account identifier.

14. The method of claim 2, wherein determining the status of the first account is further based on:

determining an account balance for the first account; and determining whether a requirement for the first serial communication corresponds to the account balance.

15. The method of claim 2, wherein processing the first serial communication using the first API subroutine comprises:

generating routing instructions for a first microservice; and executing the routing instructions.

16. The method of claim 2, wherein processing the first serial communication using the first API subroutine comprises:

accessing a first microservice; and using the first microservice to complete the first API subroutine.

17. One or more non-transitory, computer-readable media, comprising instructions for processing encrypted serial communications using secured bifurcated application interface programming (API) subroutines, when executed by one or more processors, cause operations comprising:

receiving, via a bifurcated serial communication processing API, a first serial communication for a first account;

determining an encryption requirement of a first function of the first serial communication;

determining that the encryption requirement corresponds to a first API subroutine;

determining to add a first subroutine identifier to the first serial communication based on determining that the encryption requirement corresponds to the first API subroutine;

processing the first serial communication using the first API subroutine;

determining a status of the first account based on an account locking function;

in response to determining that the status corresponds to completing the first serial communication, completing the first serial communication; and generating for display, on a user interface, a first confirmation based on completing the first serial communication.

18. The one or more non-transitory, computer-readable media of claim 17, further comprising:

receiving, via the bifurcated serial communication processing API, a second serial communication for the first account;

processing the second serial communication using a second API subroutine; and querying the account locking function in the first API subroutine to determine whether to complete the second serial communication.

19. The one or more non-transitory, computer-readable media of claim 17, further comprising:

receiving a response to querying the account locking function in the first API subroutine;

determining that the first account is not locked based on the response; and determining to complete a second function using the second API subroutine based on determining that the first account is not locked.

20. The one or more non-transitory, computer-readable media of claim 17, further comprising:

determining an account identifier for the first account; and determining whether a required identifier for the first serial communication corresponds to the account identifier.

* * * * *